United States Patent
Gattis et al.

(10) Patent No.: US 9,781,915 B2
(45) Date of Patent: Oct. 10, 2017

(54) IMPLEMENT AND BOOM HEIGHT CONTROL SYSTEM AND METHOD

(71) Applicant: AgJunction LLC, Hiawatha, KS (US)

(72) Inventors: Joshua M. Gattis, Robinson, KS (US); Steven A. Koch, Centralia, KS (US)

(73) Assignee: AGJUNCTION LLC, Hiawatha, KS (US)

( * ) Notice: Subject to any disclaimer, the term of this patent is extended or adjusted under 35 U.S.C. 154(b) by 400 days.

(21) Appl. No.: 14/214,215

(22) Filed: Mar. 14, 2014

(65) Prior Publication Data
US 2014/0277676 A1    Sep. 18, 2014

Related U.S. Application Data

(60) Provisional application No. 61/783,973, filed on Mar. 14, 2013.

(51) Int. Cl.
*A01M 7/00* (2006.01)
*A01C 23/00* (2006.01)
*A01M 9/00* (2006.01)

(52) U.S. Cl.
CPC ......... *A01M 7/0057* (2013.01); *A01C 23/008* (2013.01); *A01M 9/0076* (2013.01)

(58) Field of Classification Search
CPC .. A01M 7/0057; A01M 9/0076; A01C 23/008
See application file for complete search history.

(56) References Cited

U.S. PATENT DOCUMENTS

| | | | |
|---|---|---|---|
| 5,050,771 A | * | 9/1991 | Hanson .............. A01M 7/0089 222/1 |
| 5,194,851 A | | 3/1993 | Kraning et al. |
| 5,348,226 A | | 9/1994 | Heiniger et al. |
| 5,390,125 A | | 2/1995 | Sennott et al. |
| 5,663,879 A | | 9/1997 | Trovato et al. |
| 5,684,476 A | | 11/1997 | Anderson |
| 5,923,270 A | | 7/1999 | Sampo et al. |
| 6,052,647 A | | 4/2000 | Parkinson et al. |
| 6,070,673 A | | 6/2000 | Wendte |
| 6,073,070 A | | 6/2000 | Diekhans |

(Continued)

FOREIGN PATENT DOCUMENTS

| | | |
|---|---|---|
| AU | 2002244539 | 10/2002 |
| AU | 2002325645 | 3/2003 |

(Continued)

OTHER PUBLICATIONS

"International Search Report and Written Opinion", PCT/US2015/020799, Jun. 25, 2015.

(Continued)

*Primary Examiner* — Rodney Butler
(74) *Attorney, Agent, or Firm* — Schwabe Williamson & Wyatt

(57) ABSTRACT

A global navigation satellite system (GNSS) based control system is provided for positioning a working component relative to a work surface. Inertial measurement unit (IMU) sensors, such as accelerometers and gyroscopes, are mounted on the working component and provide positioning signals to a control compute engine. A method of positioning a working component relative to a work surface using GNSS-based positioning signals is also disclosed.

16 Claims, 1 Drawing Sheet

(56) References Cited

U.S. PATENT DOCUMENTS

| | | | |
|---|---|---|---|
| 6,212,453 B1 | 4/2001 | Kawagoe et al. | |
| 6,377,889 B1 | 4/2002 | Soest | |
| 6,445,983 B1 | 9/2002 | Dickson et al. | |
| 6,539,303 B2 | 3/2003 | McClure et al. | |
| 6,711,501 B2 | 3/2004 | McClure | |
| 6,789,014 B1 | 9/2004 | Rekow et al. | |
| 6,804,587 B1 | 10/2004 | O Connor et al. | |
| 6,819,780 B2 | 11/2004 | Benson et al. | |
| 6,865,465 B2 | 3/2005 | McClure | |
| 6,876,920 B1 | 4/2005 | Mailer | |
| 7,142,956 B2 | 11/2006 | Heiniger et al. | |
| 7,277,792 B2 | 10/2007 | Overschie | |
| 7,437,230 B2 | 10/2008 | McClure | |
| 7,460,942 B2 | 12/2008 | Mailer | |
| 7,623,952 B2 | 11/2009 | Unruh et al. | |
| 7,650,252 B2 | 1/2010 | Douglas | |
| 7,689,354 B2 | 3/2010 | Heiniger et al. | |
| RE41,358 E | 5/2010 | Heiniger et al. | |
| 7,860,628 B2 | 12/2010 | Lange | |
| 8,140,223 B2 | 3/2012 | Whitehead et al. | |
| 8,190,337 B2 | 5/2012 | McClure | |
| 8,214,111 B2 | 7/2012 | Heiniger | |
| 8,265,826 B2 | 9/2012 | Feller et al. | |
| 8,386,129 B2 | 2/2013 | Collins | |
| 8,437,901 B2 | 5/2013 | Anderson | |
| 8,548,649 B2 | 10/2013 | Guyette | |
| 8,583,315 B2 | 11/2013 | Whitehead | |
| 8,583,326 B2 | 11/2013 | Collins | |
| 8,594,879 B2 | 11/2013 | Roberge | |
| 8,634,993 B2 | 1/2014 | McClure et al. | |
| 8,649,930 B2 | 2/2014 | Reeve et al. | |
| 9,002,565 B2 * | 4/2015 | Jones | E02F 9/2045 342/357.39 |
| 2002/0049538 A1 | 4/2002 | Knapton et al. | |
| 2002/0072850 A1 | 6/2002 | McClure et al. | |
| 2004/0186644 A1 | 9/2004 | McClure et al. | |
| 2006/0167600 A1 | 7/2006 | Nelson, Jr. et al. | |
| 2008/0195268 A1 | 8/2008 | Sapilewski et al. | |
| 2009/0099737 A1 | 4/2009 | Wendte et al. | |
| 2009/0121932 A1 | 5/2009 | Whitehead et al. | |
| 2009/0164067 A1 | 6/2009 | Whitehead | |
| 2009/0312974 A1 | 12/2009 | Douglas | |
| 2010/0312428 A1 * | 12/2010 | Roberge | A01B 69/007 701/23 |
| 2011/0015817 A1 | 1/2011 | Reeve | |
| 2011/0018765 A1 | 1/2011 | Whitehead et al. | |
| 2011/0054729 A1 * | 3/2011 | Whitehead | A01B 69/007 701/31.4 |
| 2011/0224873 A1 | 9/2011 | Reeve | |
| 2011/0231061 A1 | 9/2011 | Reeve et al. | |
| 2011/0266365 A1 | 11/2011 | Hrnicek | |
| 2012/0087771 A1 | 4/2012 | Wenzel | |
| 2012/0130593 A1 | 5/2012 | Davis et al. | |
| 2012/0169495 A1 | 7/2012 | Kowalchuk | |
| 2012/0173093 A1 | 7/2012 | Kowalchuk | |
| 2012/0174445 A1 * | 7/2012 | Jones | A01B 69/007 37/197 |
| 2012/0215410 A1 | 8/2012 | McClure et al. | |
| 2012/0301220 A1 * | 11/2012 | Snoeck | E01C 23/088 404/75 |
| 2013/0008360 A1 | 1/2013 | Follmer | |
| 2013/0179026 A1 * | 7/2013 | McClure | A01B 69/008 701/25 |
| 2013/0311050 A1 | 11/2013 | Cash et al. | |
| 2013/0345937 A1 | 12/2013 | Strelioff et al. | |
| 2014/0074360 A1 * | 3/2014 | Rosa | G05D 3/12 701/50 |
| 2014/0093397 A1 | 4/2014 | Engelbrecht et al. | |
| 2014/0168009 A1 * | 6/2014 | Peake | E02F 9/264 342/357.34 |

FOREIGN PATENT DOCUMENTS

| | | |
|---|---|---|
| WO | 2008080193 | 7/2008 |
| WO | 2010005945 | 1/2010 |
| WO | 2012146255 | 11/2012 |

OTHER PUBLICATIONS

Noh, Kwang-Mo, Self-tuning controller for farm tractor guidance, Iowa State University Retrospective Theses and Dissertations, Paper 9874, (1990).

Van Zuydam,. R.P., Centimeter-Precision Guidance of Agricultural Implements in the Open Field by Means of Real Tim Kinematic DGPS, ASA-CSSA-SSSA, pp. 1023-1034 (1999).

* cited by examiner

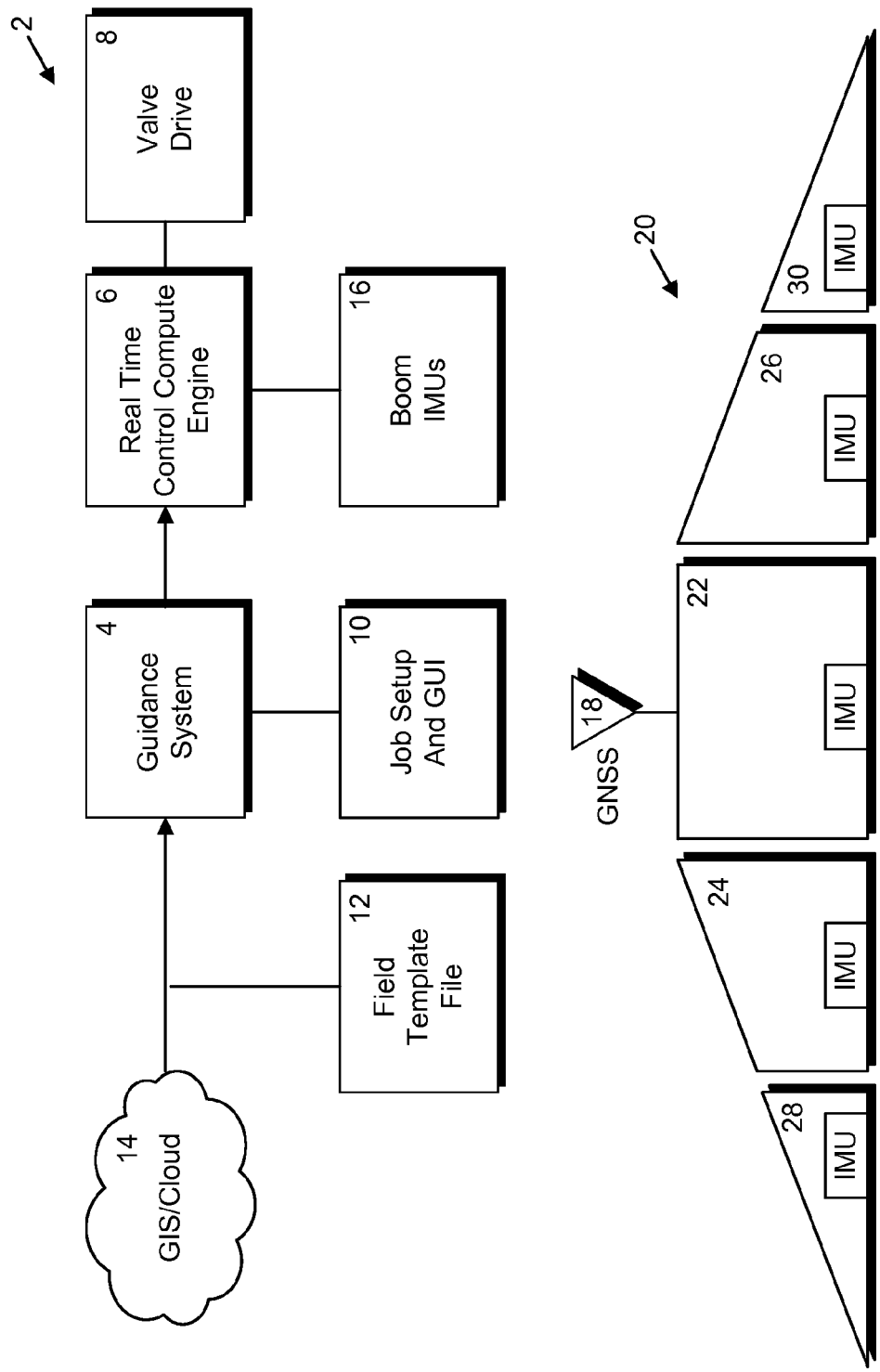

IMPLEMENT AND BOOM HEIGHT CONTROL SYSTEM AND METHOD

CROSS-REFERENCE TO RELATED APPLICATION

This application claims priority in U.S. Provisional Patent Application No. 61/783,973, filed Mar. 14, 2013, which is incorporated herein by reference. U.S. Pat. No. 6,539,303; No. 6,711,501; No. 8,214,111; No. 8,386,129; No. 8,548,649; No. 8,583,315; No. 8,583,326; and No. 8,594,879 are also incorporated herein by reference.

BACKGROUND OF THE INVENTION

1. Field of the Invention

The present invention relates generally to automated machine control and, in particular, to an agricultural spray boom height control system and method.

2. Description of the Related Art

Movable machinery, such as agricultural equipment, open-pit mining machines, airplane crop dusters, and the like all benefit from accurate global navigation satellite system (GNSS) high precision survey products, and others. However, in existing satellite positioning systems (SATPS) for guided parallel and contour swathing for precision farming, mining, and the like, the actual curvature of terrain may not be taken into account. This results in a less than precise production because of the less than precise parallel or contour swathing. Indeed, in order to provide swaths through a field (in farming, for example), the guidance system collects positions of the vehicle as it moves across the field. When the vehicle commences the next pass through the field, the guidance system offsets the collected positions for the previous pass by the width of the equipment (i.e. swath width). The next set of swath positions is used to provide guidance to the operator as he or she drives the vehicle through the field. The current vehicle location, as compared to the desired swath location, is provided to the vehicle's operator or to a vehicle's steering system. The SATPS provides the 3-D location of signal reception (for instance, the 3-D location of the antenna).

Various navigation systems for ground-based vehicles have been employed but each includes particular disadvantages. Systems using Doppler radar will encounter errors with the radar and latency. Similarly, gyroscopes, which may provide heading, roll, or pitch measurements, may be deployed as part of an inertial navigation package, but tend to encounter drift errors and biases and still require some external attitude measurements for gyroscope initialization and drift compensation. Gyroscopes have good short-term characteristics but undesirable long-term characteristics, especially those gyroscopes of lower cost such as those based on a vibrating resonator. Similarly, inertial systems employing gyroscopes and accelerometers have good short-term characteristics but also suffer from drift. Various systems include navigating utilizing GNSS; however, these systems also exhibit disadvantages. Existing GNSS position computations may include lag times, which may be especially troublesome when, for example, GNSS velocity is used to derive vehicle heading. As a result, the position (or heading) solution provided by a GNSS receiver tells a user where the vehicle was a moment ago, but not in real time. Existing GNSS systems do not provide high quality heading information at slower vehicle speeds. Therefore, what is needed is a low cost sensor system to facilitate vehicle swath navigation that makes use of the desirable behavior of both GNSS and inertial units while eliminating or reducing non-desirable behavior. Specifically, what is needed is a means to employ low-cost gyroscopes (e.g., micro electromechanical (MEM) gyroscopes) which exhibit very good short-term low noise and high accuracy while removing their inherent long-term drift.

Providing multiple antennas on a vehicle can provide additional benefits by determining an attitude of the vehicle from the GNSS ranging signals received by its antennas, which are constrained on the vehicle at a predetermined spacing. For example, high dynamic roll compensation signals can be output directly to the vehicle steering using GNSS-derived attitude information. Components such as gyroscopes and accelerometers can be eliminated using such techniques. Real-time kinematic (RTK) navigation can be accomplished using relatively economical single frequency L1-only receivers with inputs from at least two antennas mounted in fixed relation on a rover vehicle. Still further, moving baselines can be provided for positioning solutions involving tractors and implements and multi-vehicle GNSS control can be provided.

Providing additional antennas in combination with standard SATPS and GNSS guidance, as mentioned above, along with optional gyroscopes is an effective method to increase GNSS positioning precision and accuracy, such as is described in U.S. Patent Publication No. 2009/0164067, which is assigned to a common assignee and is incorporated herein. However, accuracy and precision can only improve the efficiency of working vehicles, such as those in the agricultural field, to a limited extent. Although such systems are able to track and guide vehicles in three dimensions, including along ridges and sloped-regions, errors may appear in other aspects of a working vehicle. For example, in an agricultural field-working situation where a tractor is towing an implement, the implement may slide on a sloped-region, or the tractor may list to one side or another when entering softer soil or rocky areas. This can happen repeatedly when a vehicle is guided around the same field, regardless of the precision of the guidance system in pre-planning a path. Thus, a system that can detect such changes in uniformity of a field as the vehicle traverses a path and remember those changes can predict and re-route a more accurate and more economical path than a guidance system alone. Heretofore there has not been available a system and method with the advantages and features of the present invention.

Conventional agricultural spraying operations are carried out over an entire field, everywhere the crop is planted. In contrast, environmental spraying allows the spraying of certain materials which require restrictions in the area of deposition due to potential toxicity or strength. The restrictions can include the distance from waterways and slope of the ground which can affect run-off and concentrations of deposits.

SUMMARY OF THE INVENTION

In the practice of the present invention, position sensors (such as GNSS and IMU) are used to accurately locate the implement (such as a spray boom) with reference to the ground, standing crop, or other field features. Real time compute engine processes control algorithms to compare sensor data with spatial data logged from a previous operation, or terrain model, to make control decisions which maintain desired implement height.

BRIEF DESCRIPTION OF THE DRAWINGS

The drawings constitute a part of this specification and include exemplary embodiments of the present invention illustrating various objects and features thereof.

FIG. 1 is a schematic diagram of a boom height control system embodying an aspect of the present invention.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment

FIG. 1 is a schematic diagram of a boom height control system 2. Without limitation on the generality of useful applications of the present invention, the system 2 is shown for controlling the height of a spray boom 20, which can be used for agricultural applications, such as spraying fertilizer, herbicides, pesticides, water, etc. The control system 2 includes a guidance system 4, which can be global navigation satellite system (GNSS) based. A real-time control compute engine 6 is connected to the guidance system 4 and can be programmed with specific control instructions and applications, including variable-rate (VR), selective control, guidance, auto-steering, etc. A valve drive 8 can be connected to the compute engine 6 for connection to a steering system of a vehicle, such as a tractor or a self-propelled equipment piece.

The guidance system is connected to a job set up and graphical user interface (GUI) component 10, which can include suitable display monitor components. A field template file 12 is provided for specific fields and includes such information as GNSS-defined field coordinates, material prescription information, environmental conditions and equipment routing directions. Geodesic information system (GIS) and cloud (e.g., Internet) 14 data sources and connectivity are provided for communicating bi-directionally with the other components of the system 2.

Boom inertial measurement units 16 are connected to the control compute engine 6, and can include such devices as accelerometers and gyroscopes for measuring inertia and positioning information in three axes (X, Y, Z). The boom 20 can include a GNSS receiver with an antenna 18, or can be directly controlled via the implement motive component, such as a tractor. The boom 20 includes sections 22, 24, 26, 28, 30, each equipped with its own inertial measurement unit (IMU) 16. The boom sections can be articulated for conforming to field conditions.

Use Case:
1) Field is logged/mapped using highly accurate sensors (such as RTK GNSS) for measurement of field terrain elevations. This may be done as an independent step using an ATV or field truck or data may be used/collected from another farming operation such as harvesting, which covers the same terrain
2) Field log data may be stored in an office/cloud GIS and data management toolset.
3) File is loaded in guidance system on target machine (sprayer, for example).
4) User selects the job file in the guidance system which includes the processed elevation data.
5) The user chooses/sets up boom control options to use the field log including desired height above the target.
6) As the system works across the field, sensor data is compared to elevation data and performs real-time control through a mechanical control system (typically electro-hydraulic or mechanical in nature)

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A method of controlling the position of a working component relative to a work surface, comprising:
   storing field terrain elevation data for the work surface;
   receiving a selection of a desired height of the working component above the work surface;
   receiving inertial movement data from multiple inertial measurement units (IMU) located on different sections of the working component as part of sensor data identifying different x, y, and z positions for the different sections of the working component with respect to the work surface;
   comparing the sensor data with the field terrain elevation data; and
   adjusting heights of the different sections of the working component relative to the work surface based on the desired height of the working component above the work surface and the comparison of the inertial movement data with the field terrain elevation data.

2. A method of controlling the position of a working component relative to a work surface, comprising:
   storing field terrain elevation data for the work surface;
   receiving a selection of a desired height of the working component above the work surface;
   receiving sensor data identifying a position of the working component with respect to the work surface;
   comparing the sensor data with the field terrain elevation data;
   adjusting a height of the working component relative to the work surface based on the desired height of the working component above the work surface and the comparison of the sensor data with the field terrain elevation data;
   receiving inertial movement data as at least part of the sensor data, wherein different portions of the inertial movement data are associated with different sections of the working component;

comparing the inertial movement data for the different sections of the working component with the field terrain elevation data; and adjusting the height of the working component relative to the work surface based the comparison of the inertial movement data associated with the different sections of the working component with the field terrain elevation data.

3. The method of claim 2, further comprising receiving the inertial movement data from separate inertial measurement units located on the different sections of the working component.

4. The method of claim 2, further comprising adjusting individual heights of the different sections of the working component relative to the work surface based on the comparison of the inertial movement data associated with the different sections of the working component with the field terrain elevation data.

5. The method of claim 1, further comprising:
receiving global navigation satellite system (GNSS) measurements for the working component as at least part of the sensor data; and
adjusting the height of the working component based on a comparison of the GNSS measurements and the field terrain elevation data.

6. The method of claim 1, wherein the sensor data includes both gyroscope inertial measurements and global navigation satellite system (GNSS) measurements.

7. The method of claim 1, further comprising adjusting the height of the working component using an electro-hydraulic mechanism.

8. The method of claim 1, further comprising:
measuring the field terrain elevation data for the work surface in an initial measurement operation;
storing the measured field terrain elevation data in a data management system;
load the measured field terrain elevation data from the data management system into a vehicle guidance system;
receiving the sensor data during a second operation as the working component travels over the working surface;
comparing the measured field terrain elevation data with the sensor data as the working component travels over the working surface.

9. A height control system for a work implement, comprising:
a processing system to:
load elevation data for a work surface;
identify a desired height of the work implement above the work surface;
receive sensor data from different inertial measurement units located on different sections of the work implement identifying different positions of the work implement with respect to the work surface;
compare the sensor data with the elevation data; and
adjust heights of the different sections of work implement based on the comparison of the sensor data with the elevation data to maintain the desired height of the work implement above the work surface.

10. A height control system for a work implement, comprising:

a processing system to:
load elevation data for a work surface;
identify a desired height of the work implement above the work surface;
receive sensor data identifying a position of the work implement with respect to the work surface;
compare the sensor data with the elevation data;
adjust a height of the work implement based on the comparison of the sensor data with the elevation data to maintain the desired height of the work implement above the work surface;
receive inertial movement data as at least part of the sensor data, wherein different portions of the inertial movement data are associated with different sections of the work implement;
compare the inertial movement data for the different sections of the work implement with the elevation data; and
adjust the height for the work implement above the work surface based the comparison of the inertial movement data for the different sections of the work implement with the elevation data.

11. The height control system of claim 10, the processing system further to receive the inertial movement data from separate inertial measurement units located on the different sections of the work implement.

12. The height control system of claim 11, the processing system further to adjust individual heights of the different sections of the work implement above the work surface based the comparison of the inertial movement data associated with the different sections of the work implement with the elevation data.

13. The height control system of claim 9, the processing system further to:
receive global navigation satellite system (GNSS) measurements for the work implement as at least part of the sensor data; and
adjust the height of the work implement based on a comparison of the GNSS measurements with the elevation data.

14. The height control system of claim 9, wherein the sensor data includes both inertial gyroscope measurements and global navigation satellite system (GNSS) measurements identifying the position of the work implement along X, Y, and Z axes.

15. The height control system of claim 9, the processing system further to use an electro-hydraulic mechanism to adjust the height of the work implement.

16. The height control system of claim 9, the processing system further to:
load the elevation data from an initial measurement operation prior to the work implement traveling over the work surface;
receive the sensor data as the work implement travels over the work surface; and
compare the elevation data with the sensor data and adjust the height of the work implement as the work implement travels over the work surface.

* * * * *